Figure 1:
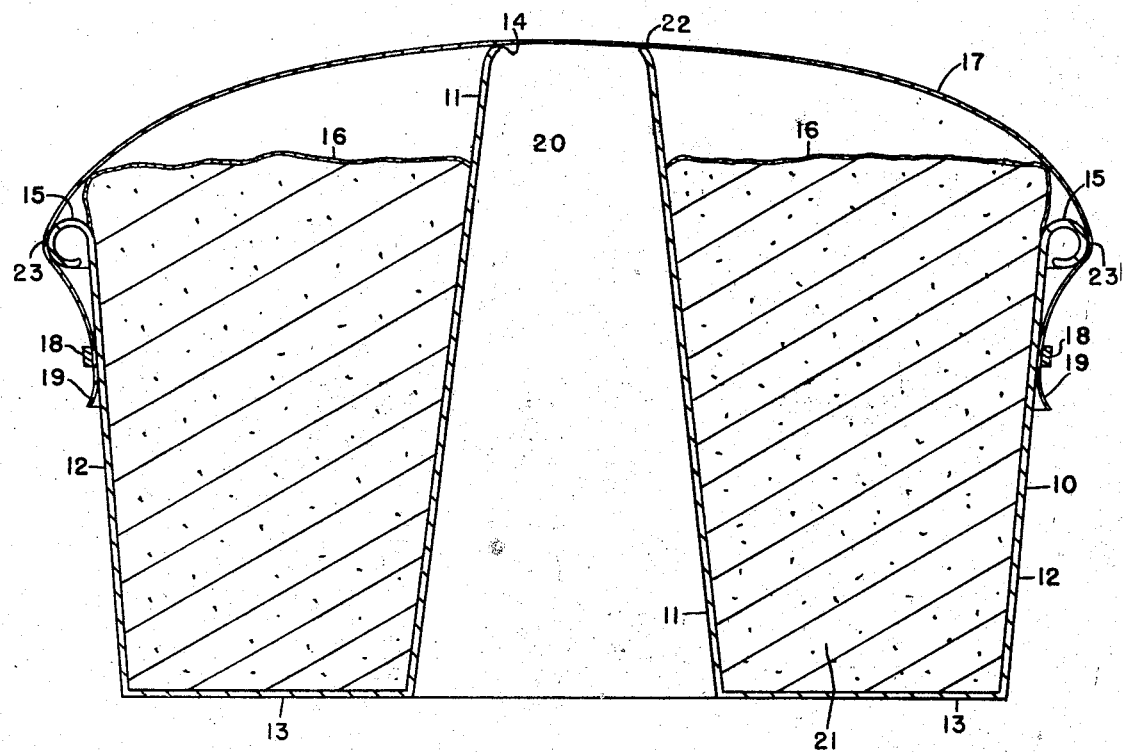

Feb. 3, 1942.   J. M. LUKER   2,271,921
ANGEL FOOD CAKE PACKAGE
Filed March 29, 1940

INVENTOR
JACKSON M. LUKER
BY
*Jugelter & Jugelter*
ATTORNEYS

Patented Feb. 3, 1942

2,271,921

UNITED STATES PATENT OFFICE 2,271,921

ANGEL FOOD CAKE PACKAGE

Jackson M. Luker, Urbana, Ill.

Application March 29, 1940, Serial No. 326,629

4 Claims. (Cl. 99—171)

This invention relates to packages, and more particularly to a transportation package for angel food cakes.

An object of the present invention is to provide a merchandisable package for angel food cakes which are characterized by a myriad of easily rupturable air cells.

A further object of the invention is to provide a merchandisable package for angel food cakes wherein such cakes may be delivered to the ultimate consumer in the same utensil in which they are baked.

Another object of the invention is to provide a merchandisable package for angel food cakes, wherein such cakes may be freely transported and then stored for several days without being adversely affected as to volume, tenderness and palatability.

Still another object of the invention is to provide a method of packaging angel food cakes in merchandisable packages wherein the steps of cooling, dumping and wrapping the individual cakes may be dispensed with, thereby reducing the packaging costs, which saving may be passed on to the ultimate consumer.

Still a further object of the invention is to provide a merchandisable package for angel food bakery products, which is adapted to be stacked for delivery or display purposes without damage to the product housed therein.

These and other objects are attained by the means described herein and disclosed in the accompanying drawing, in which, the single figure is a vertical section taken through a merchandisable package embodying the present invention.

Heretofore, cakes of the angel food variety were baked in suitable utensils, after which they were cooled, dumped out upon suitable trays, and then individually wrapped or packaged for the ultimate consumer. By reason of such treatment, the air cells of the cake were often ruptured, thereby reducing the size or volume of the cake and increasing its density with the result that the product delivered to the ultimate consumer was tough and unpalatable.

The present invention is directed, among other things, to the provision of a merchandisable package for angel food cakes, which will permit them to be delivered to the ultimate consumer having substantially the same volume and degree of tenderness as they had when removed from the baking oven.

With reference to the figure, the numeral 10 indicates a bake pan or other utensil of the general type in which cakes of the angel food variety are baked. Such pan may comprise a pair of concentric, spaced inner and outer walls 11 and 12 interconnected at their lower ends by bottom 13. The inner wall 11 comprises a centrally disposed upstanding tapered heat conducting tube 20, which terminates in upper edge 14. The upper edge of outer wall 12 may terminate in a rolled edge 15 which is preferably lower than the upper edge 14 of inner wall 11, as shown. The upstanding walls 11 and 12 and bottom 13 form a U-shaped pocket into which the cake batter is poured prior to baking, and which the finished cake, denoted generally by the numeral 21, will substantially fill, as illustrated.

It should be understood that angel food cakes are made from a batter the bulk of which comprises egg whites thoroughly aerated by whipping, whereby the batter, comprises literally millions of minute air cells. During the baking process these air cells expand causing the cake to rise thereby imparting to the cake a light, fluffy texture. As the cake rises incident to baking it clings to the side walls of the pan in such a manner as to support the central portion thereof, and to provide an effective air seal between abutting faces of the cake and pan walls. The exposed top edge of the cake acquires a pliable but dense crust 16, during the baking operation. This crust, it should be noted, extends between the inner and outer walls of the pan, and comprises an effective air seal over the cake top.

It should be noted that so long as the individual air cells of the cake remain intact and unruptured, the volume or size of the cake will be a maximum and its texture will be light, fluffy and tender.

In order that the baked angel food cake product may be delivered to the ultimate consumer having substantially the same physical characteristics as when removed from the baking oven, it is packaged for sale in the same pan in which it was baked. Such packaging comprises the single step of applying a cover-member 17 over the upper open or top portion of the pan.

Cover member 17 is preferably a semi-moisture proof membranous sheet of material, which will permit some of the cake moisture to be dissipated therethrough. As illustrated, the cover member preferably makes physical contact with and along the upper edges of both the inner and outer pan walls as at 22 and 23, respectively, whereby to completely close the upper open end of the U-shaped pocket in which the cake is disposed. The lower edges 19 of the cover member 11 may be snugly secured to the outer wall 12 by means of a retaining member 18 which circumscribes it as shown. Retaining member 18 may comprise an elastic band, a length of cord or wire, or a length of tape, or the like.

When so packaged, angel food cakes, after having been transported by truck several hundred miles and stored for over a week are, when unpackaged, as large, tender and palatable as when baked.

The cost of packaging angel food cakes by the hereinabove described method is considerably less than the cost of packaging similar cakes in individual disposable containers or cartons, as done in the past. Heretofore it was necessary to permit the cake to cool after baking, after which the cake was turned out of the bake pan onto a tray, or the like. Each cake was individually wrapped and then boxed in a disposable container for delivery to the purchaser. Such packaging procedure was expensive from the standpoint of labor required and materials used. In addition thereto, the cake itself was adversely affected by the handling incident to the packaging operation to such an extent that the size of the cake delivered to the ultimate consumer was smaller than the size of the cake when it came from the oven. The texture of the cake was likewise affected adversely by such handling. These disadvantages are completely obviated by the herein disclosed merchandisable package.

Inasmuch as cakes of the angel food variety have a tendency to corrode or eat away certain metals with which they are brought into prolonged contact, such as tin for example, bake pan 10 is preferably fabricated from aluminum. This metal is not adversely affected by the acid content of such cakes, nor does it become discolored even after extended use. If desired, pan 10 may be fabricated from ovenproof glassware, or from copper, however, I have found that from the standpoint of durability, initial cost and upkeep, aluminum pans are the most satisfactory. It should be observed that the pans are adapted to be used over and over, being exchanged when empty for another pan containing a cake, in a manner similar to the exchange of empty milk bottles for filled ones. It should likewise be observed that such packages may be stacked, for the purpose of transportation or display, without damage to the contents thereof. Each heat tube 20 comprises an upstanding bearing or support member upon which plane articles such as trays and the like may be disposed, which in turn may contain cake pans or other articles of merchandise. This is in sharp contrast to the precautions required to prevent crushing of angel food cakes when individually packaged in disposable cardboard containers.

From the foregoing, it is apparent that I have provided a merchandisable package for cakes of the angel food variety, wherein the cakes may be delivered to the ultimate consumer in the same utensils in which they are baked and wherein the cakes will remain large, light, tender and fluffy even though stored for a week or more.

It should be understood that various modifications and changes in the structural details of the device may be made, within the scope of the appended claims, without departing from the spirit of the invention.

What is claimed is:

1. An angel food cake package which comprises an open topped tubed aluminum cake pan containing an angel food cake baked therein, said cake characterized by a myriad of easily rupturable air cells, a semi-moisture proof cover member disposed across the open top of said pan for completely housing said cake, and means for securing said cover member to said pan and across said open top, whereby transportation and merchandising of the cake is facilitated and the cake remains in a normal condition retaining for a week or more substantially its original volume, tenderness and palatability.

2. The method of packaging an angel food cake for transportation and merchandising whereby the cake retains for a week or more, substantially its original volume, tenderness and palatability, which method comprises the steps of baking an angel food cake batter in a tubed cake pan fabricated from a material which will not corrode incident to prolonged contact with angel food cake, of then placing a semi-moisture proof cover member over the upper, exposed portion of the cake and over the upper perimeters of the cake pan, and of then securing said cover member in place against accidental or unintentional displacement.

3. An angel food cake package which comprises in combination, an aluminum bake pan including a bottom and a pair of inner and outer concentric upstanding walls which form an annular U-shaped cake receiving pocket open at its upper end, an angel food cake baked in said pocket, a semi-moisture proof cover member disposed across said pocket and contacting the perimeter of each of said upstanding walls for completely enclosing the cake housed within said pocket, and means circumscribing said outer wall for anchoring said cover member in position across said pocket.

4. As a new article of manufacture an angel food cake package for facilitating the transportation and merchandising of angel food cake, whereby said cake will retain for a week or more substantially its original volume, tenderness and palatability, said article comprising an open topped substantially non-deformable tubed container fabricated from material substantially unaffected by prolonged contact with angel food cake, an angel food cake baked therein, and a semi-moisture proof cover member disposed over the open top of said container for completely enclosing said cake.

JACKSON M. LUKER.